US009796635B1

(12) United States Patent
Luan et al.

(10) Patent No.: US 9,796,635 B1
(45) Date of Patent: Oct. 24, 2017

(54) LARGE DIAMETER SLAG WOOL, COMPOSITION AND METHOD OF MAKING SAME

(71) Applicant: USG INTERIORS, LLC, Chicago, IL (US)

(72) Inventors: Wenqi Luan, Kildeer, IL (US); Martin Brown, Gurnee, IL (US); Tanya Keller, Red Wing, MN (US); Mike Hill, Red Wing, MN (US); Scott A. Bogen, Chicago, IL (US); Carlos Figi, Chicago, IL (US); William Frank, Lake Villa, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 15/189,662

(22) Filed: Jun. 22, 2016

(51) Int. Cl.
C03B 1/00 (2006.01)
C04B 35/80 (2006.01)
C04B 35/622 (2006.01)
E04B 9/04 (2006.01)
E04B 1/84 (2006.01)

(52) U.S. Cl.
CPC ...... C04B 35/803 (2013.01); C04B 35/62245 (2013.01); E04B 1/8409 (2013.01); E04B 9/04 (2013.01); C04B 2235/5228 (2013.01)

(58) Field of Classification Search
CPC ............. F16L 59/04; C03B 1/00; C03C 13/06
See application file for complete search history.

(56) References Cited

U.S. PATENT DOCUMENTS

| | | |
|---|---|---|
| 1,769,519 A | 7/1930 | King et al. |
| 2,020,403 A | 11/1935 | Engle |
| 3,246,063 A | 4/1966 | Podgurski |
| 3,307,651 A | 3/1967 | Podgurski |
| 3,426,063 A | 2/1969 | Gros |
| 3,445,257 A | 5/1969 | Hloch |
| 3,802,386 A | 4/1974 | Wendlandt et al. |
| 3,930,876 A | 1/1976 | Nakajima et al. |
| 4,288,252 A | 9/1981 | Neely |
| 4,328,019 A * | 5/1982 | Dejaiffe ............... C03B 5/0272 373/34 |
| 4,541,854 A | 9/1985 | Schonhaar et al. |
| 4,720,295 A | 1/1988 | Bronshtein |
| 4,818,595 A | 4/1989 | Ellis |
| 4,911,788 A | 3/1990 | Pittman et al. |
| RE33,773 E | 12/1991 | Guerro et al. |
| 5,250,153 A | 10/1993 | Izard et al. |
| 5,332,699 A | 7/1994 | Olds et al. |
| 5,472,917 A * | 12/1995 | Talling ............... C03B 1/02 106/714 |
| 5,496,392 A | 3/1996 | Sims et al. |
| 5,558,710 A | 9/1996 | Baig |
| 5,614,449 A | 3/1997 | Jensen |
| 5,709,728 A | 1/1998 | Fleckenstein et al. |
| 5,750,255 A * | 5/1998 | Yoshida ............... C03B 1/02 110/224 |
| 5,776,392 A | 7/1998 | Schmuck |
| 5,911,818 A | 6/1999 | Baig |
| 6,077,798 A | 6/2000 | Rapp |
| 6,171,388 B1 | 1/2001 | Jobbins |
| 6,265,335 B1 | 7/2001 | Oleske et al. |
| 6,305,495 B1 | 10/2001 | Keegan |
| 6,428,616 B1 | 8/2002 | Neely, Jr. |
| 6,443,258 B1 | 9/2002 | Putt et al. |
| 6,893,752 B2 | 5/2005 | Veeramasuneni et al. |
| 6,897,173 B2 | 5/2005 | Bernard et al. |
| 6,919,132 B2 | 7/2005 | Felegi, Jr. et al. |
| 7,056,460 B2 | 6/2006 | Englert |
| 7,364,015 B2 | 4/2008 | Englert et al. |
| 7,851,052 B2 | 12/2010 | Caldwell |
| 8,133,357 B2 | 3/2012 | Cao et al. |
| 8,536,259 B2 | 9/2013 | Carbo et al. |
| 8,603,231 B2 | 12/2013 | Wagh et al. |
| 8,697,588 B2 | 4/2014 | Brown |
| 8,967,823 B2 | 3/2015 | D'Antonio |
| 9,073,780 B2 | 7/2015 | Schinkinger et al. |
| 9,076,428 B2 | 7/2015 | Kipp et al. |
| 9,382,153 B2 | 7/2016 | Fisher et al. |
| 2004/0039098 A1 | 2/2004 | Belmares et al. |
| 2007/0055012 A1 | 3/2007 | Caldwell |
| 2007/0277948 A1 | 12/2007 | Carbo et al. |
| 2011/0262721 A1 | 10/2011 | Albertelli et al. |
| 2013/0330534 A1 | 12/2013 | Schinkinger et al. |
| 2013/0334726 A1 | 12/2013 | Hernandez-Torres et al. |
| 2016/0032583 A1 | 2/2016 | Xu et al. |

FOREIGN PATENT DOCUMENTS

| | | | |
|---|---|---|---|
| CN | 103145342 A * | 2/2013 | ............. C03C 13/06 |
| CN | 103145342 A | 6/2013 | |
| DE | 1052646 B | 3/1959 | |
| EP | 0194371 A1 | 9/1986 | |
| WO | WO-2010/114626 A1 | 10/2010 | |
| WO | WO-2017/123270 A1 | 7/2017 | |

OTHER PUBLICATIONS

"Bonding and Coating Applications of PQ® Soluble Silicates" brochure, Industrial Chemicals Division, PQ Corporation, 7 pp. (2006).
"Sodium and Potassium Silicates: Versatile Compounds for Your Applications" brochure, PQ Europe, 16 pp. (Oct. 2004).
"Soluble Silicates in Geotechnical Grouting Applications", Bulletin 52-53, Industrial Chemicals Divistion, PQ Corporation, 6 pp. (2003).

(Continued)

Primary Examiner — Noah Wiese
(74) Attorney, Agent, or Firm — Marshall, Gerstein & Borun LLP

(57) ABSTRACT

The disclosure provides a slag wool composition including about 60 to about 80 wt. % blast furnace slag and about 20 to about 40 wt. % basalt, based on the total weight of the inorganic raw materials, wherein the composition has an A/B ratio in a range of about 1.20 to about 1.70. The disclosure further provides a slag wool produced using the slag wool composition of the disclosure, wherein the slag wool has a fiber diameter in a range of about 4.0 microns to about 10.0 microns. The disclosure further provides a method for the manufacture of slag wool.

24 Claims, No Drawings

(56) References Cited

OTHER PUBLICATIONS

International Search Report and Written Opinion, International Application No. PCT/US2017/038141, dated Aug. 30, 2017.
"Bonding and Coating Applications of PQ® Soluble Silicates" brochure, Industrial Chemicals Division, PQ Corporation, 7 pages. (2006).
"Sodium and Potassium Silicates: Versatile Compounds for Your Applications" brochure, PQ Europe, 16 pages. (Oct. 2004).
"Soluble Silicates in Geotechnical Grouting Applications", Bulletin 52-53, Industrial Chemicals—Division, PQ Corporation, 6 pages. (2003).
McDonald et al., Recent Developments in Soluble Silicate Based Binders and Coatings, 10 pages. (applicant admitted prior art).
McDonald et al., Sodium Silicate a Binder for the 21st Century, Industrial Chemicals Division, the PQ Corporation, 6 pages. (applicant admitted prior art).
Rabbii, Sodium silicate glass as an inorganic binder in foundry industry, Iranian Polymer J., 10(4):229-35 (2001).

* cited by examiner

LARGE DIAMETER SLAG WOOL, COMPOSITION AND METHOD OF MAKING SAME

FIELD OF THE INVENTION

The disclosure relates to a slag wool composition, slag wool produced from the composition of the disclosure, and a method of making slag wool. More particularly, the disclosure relates to a slag wool composition comprising furnace blast slag and basalt such that the slag wool composition has an A/B ratio of 1.20 to about 1.70, and a slag wool having a fiber diameter between about 4.0 microns and 10.0 microns.

BACKGROUND

Mineral wool is a fiber made from natural or synthetic minerals or metal oxides. Industrial applications of mineral wool include thermal insulation, filtration, padding, and soundproofing (e.g., ceiling tiles).

Mineral wool is comprised of fibers of inorganic raw materials. Mineral wool is a term broadly applied to various related vitreous products. In general, mineral wool is a fiberglass-like material composed of very fine, interlaced mineral fibers, somewhat similar in appearance to loose wool. It is composed primarily of silicates of calcium and aluminum, chromium, titanium, and zirconium. Typically, mineral wool is produced from natural rock or slag. Slag is a term broadly applied to refer to waste products of the primary metal and foundry industries, including deposits from the furnace lining charge impurities, ash from fuel, and fluxes used to clean the furnace and remove impurities. Generally speaking, although mineral fibers have an appearance that is similar to that of glass fibers, their chemical composition is significantly different from that of glass fibers due to the high content of iron and calcium and magnesium and a relatively low proportion of silicon dioxide and aluminum.

Slags are classified as either "acid" (i.e. high silicate) slags or "basic" slags, depending upon the relative quantities of acidic and basic sub-components. For example, typical acid slags contain between forty and fifty percent (40.0 to 50.0%) of acidic subcomponents, such as silicon dioxide ($SiO_2$), from twenty-five to forty-five percent (25.0 to 45.0%) of basic sub-components, such as the oxides of calcium (CaO) and magnesium (MgO), and from ten to twenty percent (10 to 20%) of alumina $Al_2O_3$. A typical basic slag that is used to reduce metals comprises between twenty-five and fifty percent (25.0 to 50.0%) acidic subcomponents such as silicon dioxide ($SiO_2$) and alumina ($Al_2O_3$), and a relatively high percentage, between thirty-four and fifty percent (34.0 to 50.0%) basic subcomponents, such as the oxides of calcium (CaO) and magnesium (MgO). Magnesium may be added to increase the basicity of the slag. Basicity is the tool used to determine the metal quality using basic slag. Basicity is calculated as follows: $(CaO+MgO)/(Al_2O_3+SiO_2)$. The basicity of typical basic slags ranges between 0.93 and 1.9.

Mineral wool is often classified according to the inorganic raw materials used in its production. For example, Rock Wool is produced from combinations of natural rocks and/or minerals. Slag Wool comprises a composition of iron, copper and lead slags typically removed from blast furnaces, and may contain some fluxing materials. Refractory (high-temperature) or "Certa" wools may be made from the oxides of aluminum, chromium, zirconium, or titanium and silica sand. Further subclassifications of these products relate to the quality or purity of the wool. For example, slag wool is subclassified for purity according to color: black, gray, and white wools are available. A tool for determining the quality of mineral wool produced from a slag charge is the acid-to-base ratio (A/B). The formula for determining A/B is $(Al_2O_3+SiO_2)/(CaO+MgO)$. As described in U.S. Pat. No. 5,496,392, in a typical mineral wool derived from cupola slag, the acid-to-base ratio ranges between 0.74 and 2.316.

Further, as described in U.S. Pat. No. 8,697,588 issued to USG Interiors, Inc, in conventional mineral wool, components are typically selected and proportioned in a way that maintains a target acid-to-base (A/B) ratio of the constituent fibers. The A/B ratio is a key parameter because it corresponds to fiber solubility, or how readily the fibers dissolve in bodily fluids, such as blood and saliva. This is an important characteristic for reasons having to do with human health, because these materials are likely to come into contact with humans as a result of their use in building construction materials.

Mineral wool plays a role in acoustical ceiling tile performance. Standard acoustical ceiling tiles have a noise reduction coefficient (NRC) greater than 0.50 and up to 0.70 and ceiling attenuation class (CAC) values of less than 35. Sound absorption is typically measured by its Noise Reduction Coefficient ("NRC") as described in ASTM C423. The NRC value is an average of four sound absorption coefficients of the particular surface at frequencies of 250 HZ, 500 HZ, 1000 HZ and 2000 HZ, which cover the range of typical human speech. NRC is represented by a number between 0 and 1.00, which indicates the fraction of sound reaching the panel that is absorbed. An acoustical panel with an NRC value of 0.60 absorbs 60% of the sound that strikes it and deflects 40% of the sound. Another test method is estimated NRC ("eNRC"), which uses an impedance tube as described in ASTM C384. The ability to reduce sound transmission is measured by the values of Ceiling Attenuation Class ("CAC") as described in ASTM E1414. CAC value is measured in decibels ("dB"), and represents the amount of sound reduction when sound is transmitted through the material. For example, an acoustical panel with a CAC of 40 reduces transmitted sound by 40 decibels. Similarly, sound transmission reduction can also be measured by its Sound Transmission Class ("STC") as described in ASTM E413 and E90. For example, a panel with an STC value of 40 reduces transmitted sound by 40 decibels.

SUMMARY

One aspect of the disclosure provides a slag wool composition including about 60 to about 80 wt. % blast furnace slag and about 20 to about 40 wt. % basalt, based on the total weight of the inorganic raw materials, wherein the composition has an A/B ratio in a range of about 1.20 to about 1.70.

Another aspect of the disclosure provides a slag wool produced using the slag wool composition of the disclosure, wherein the slag wool has a fiber diameter in a range of about 4.0 microns to about 10.0 microns.

Another aspect of the disclosure provides a method for the manufacture of slag wool, including the steps of providing a composition including about 60 to about 80 wt. % blast furnace slag and about 20 to about 40 wt. % basalt, based on the total weight of the inorganic raw materials, such that the composition has an A/B ratio in a range of about 1.20 to about 1.70, and heating the composition in a cupola or open furnace.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the invention to the specific embodiments described herein.

DETAILED DESCRIPTION

The disclosure provides a slag wool composition including about 60 to about 80 wt. % blast furnace slag and about 20 to about 40 wt. % basalt, based on the total weight of the inorganic raw materials, wherein the composition has an A/B ratio in a range of about 1.20 to about 1.70. In embodiments, the composition has an A/B ratio in a range of about 1.25 to about 1.65. In embodiments, the composition has an A/B ratio in a range of 1.25 to 1.60. In embodiments, the slag wool composition consists essentially of blast furnace slag and basalt.

As used herein, "slag wool composition" refers to the inorganic raw materials that will ultimately combine to make up the slag wool. Coke is an organic composition used to fuel the production of slag wool. Accordingly, coke is not encompassed by the term "slag wool composition."

The slag wool compositions disclosed herein advantageously utilize high slag content, which is economically and environmentally advantageous. Slag wool compositions having a high slag content are not considered to be useful for producing large diameter fibers advantageous for acoustic tiles, let alone large diameter fibers with advantageous A/B values that correspond to acceptable fiber solubility values. It has been advantageously found that the selection of a specific basalt facilitates utilization of high slag content.

The disclosure further provides a slag wool produced using the composition of the disclosure, wherein the slag wool has a fiber diameter in a range of about 4.0 microns to about 10.0 microns. The slag wool of the disclosure can advantageously be used in a number of applications, for example, thermal insulation, padding, and ceiling tile production (e.g., soundproofing). The ceiling tile market is continuing to move toward high performance ceiling tiles that offer NRC higher than 0.70. NRC can be increased through density reduction. Larger average fiber diameter and less shot in the wool help to create a low density open structure, which is essential to acoustical performance. By partially replacing slag with basalt rock, such as in the compositions of the disclosure, one or more advantages can be achieved. For example, a slag wool with an increased fiber diameter and/or lower shot content can be produced. Additionally, less coke can be used per charge, thereby lowering the melt temperature and resulting in energy savings, cost benefits, and/or additional increase in the fiber diameter of the resulting slag wool.

During the spinning process of producing mineral fiber, as the molten inorganic material is discharged from a rotor, small globules develop on the rotors and form long, fibrous tails as they travel tangentially. Not all globules that develop are converted into fiber. The nonfiberized globules that remain are referred to in the industry as "shot." Shot has no acoustical value. Accordingly, in embodiments, the slag wool of the disclosure has a shot content of about 50% or less. In embodiments, the slag wool has a shot content of about 45% or less. In embodiments, the slag wool has a shot content of about 40% or less.

In embodiments, the slag wool of the disclosure has an A/B ratio in a range of about 1.20 to about 1.70. In embodiments, the slag wool of the disclosure has an A/B ratio in a range of about 1.25 to about 1.65. In embodiments, the slag wool of the disclosure has an A/B ratio in a range of about 1.25 to about 1.60.

The disclosure further provides a method for the manufacture of slag wool, including the steps of providing a composition including about 60 to about 80 wt. % blast furnace slag and about 20 to about 40 wt. % basalt, based on the total weight of the inorganic raw material, such that the composition has an A/B ratio in a range of about 1.20 to about 1.70, and heating the composition in a cupola or open furnace. In embodiments, the composition has an A/B ratio in a range of about 1.25 to about 1.65. In embodiments, the composition has an A/B ratio in a range of about 1.25 to about 1.60. Optionally, the method further comprises providing coke such that the weight ratio of blast furnace slag and basalt to coke (i.e., (blast furnace slag+basalt)/coke) is about 6.9.

The slag wool of the disclosure can have a fiber diameter in a range of about 4.0 microns to about 10.0 microns, about 4.0 microns to about 9.75 microns, about 4.0 microns to about 9.5 microns, about 4.0 microns to about 9.0 microns, about 4.0 microns to about 8.5 microns, about 4.0 microns to about 5.5 microns, about 4.5 microns to about 8.5 microns, about 4.5 microns to about 6.75 microns, about 4.5 microns to about 5.5 microns, about 5.0 microns to about 8.0 microns, about 5.0 to about 6.75 microns, about 6 microns to about 8.5 microns, or about 7.0 microns to about 9.75 microns.

The slag of the slag wool composition is ground blast furnace slag in which the main elements are $SiO_2$, $CaO$, $Al_2O_3$, and $MgO$. Suitable blast furnace slag for the purpose of the disclosure may comprise (by weight): about 35.0% to about 40.5%, for example, about 35.3%, or about 40.2% $SiO_2$, about 35.5% to about 40.6%, for example about 40.6% or about 38.6% $CaO$, about 10.3% to about 11.4%, for example, about 11.36% or about 10.3% $MgO$, about 8.4% to about 9.8%, for example about 9.78% or about 8.4% $Al_2O_3$, about 0.2% to about 0.3%, for example, about 0.25% or about 0.3% $Fe_2O_3$, about 0.1% to about 0.3%, for example, about 0.15%, 0.25%, or 0.3% $Na_2O$, up to about 0.01% $P_2O_5$, about 0.3% to about 0.5%, for example, about 0.32%, about 0.45%, about 0.49%, or about 0.5% $K_2O$, about 0.2% to about 0.5%, for example, about 0.4% $TiO_2$, about 0.15% to about 0.55%, for example, about 0.19%, about 0.52%, or about 0.5% $Mn_2O_3$, about 0.3% to about 1.2%, for example, about 0.3%, about 0.93%, or about 1.18% $SO_3$, about 0.04% to about 0.06%, for example, about 0.05% $SrO$, up to about 0.01% $Cr_2O_3$, up to about 0.01% $ZnO$, and about 0.03% to about 0.05%, for example, about 0.04% $BaO$. Representative blast furnace slag compositions that are useful for the purpose of the disclosure are provided in the examples, below.

As used herein, basalt refers to a basic igneous rock. It consists of a mixture of iron and magnesium silicates with olivine and pyroxene as well as calcium-rich feldspar (plagioclase). Predominant mineral groups are plagioclase, pyroxene, predominantly in the form of augite or diopside. Olivine, biotite, amphibolite, as well as hornblende, alkali feldspar, quartz, hornfels and feldspathoids occur in some basalt deposits. Also, diabase, melaphyr, foidite, latite, phonolith, melilitholith, picrite, tephrite, andesite, porphyrite, spilite, trachyte, etc. are also understood as meaning basalt within the context of the invention. All in all, basalts have been found to be extremely variable rocks in terms of their chemical composition, contradicting their very standard appearance. The basalt used might be from the basalt deposits of Radlpaβ, Kloch, Oberhaag, Kim, Solosnica, Losonec, Kamenec, Zelesice, Zbraslav, Belice, Okucani, Rakovac, Ceramide, Knippa, and Dresser. In some embodiments, the basalt is from the Dresser basalt deposits.

Suitable basalt for the purpose of the disclosure may comprise (by weight): about 47.5% to about 49.5%, for example, about 49.0%, about 48.8%, or about 47.7% $SiO_2$, about 8.4% to about 9.5%, for example about 9.5%, about 9.4%, about 8.5%, or about 8.4% CaO, about 5.9% to about 7.0%, for example, about 6.5%, about 6.2%, or about 6.0% MgO, about 14.5% to about 15.5%, for example about 15.2% or about 14.9% $Al_2O_3$, about 13.0% to about 14.0%, for example, about 13.9%, about 13.8%, or about 13.2% $Fe_2O_3$, about 2.0% to about 3.0%, for example, about 2.6%, 2.4%, or 2.3% $Na_2O$, about 0.15% to about 0.25%, for example, about 0.20%, about 0.19%, or 0.18% $P_2O_5$, about 0.55% to about 0.85%, for example, about 0.80%, about 0.77%, about 0.67%, or about 0.61% $K_2O$, about 1.65% to about 2.00%, for example, about 1.82%, about 1.74%, about 1.73%, or about 1.70% $TiO_2$, about 0.15% to about 0.25%, for example, about 0.19%, about 0.20%, or about 0.21% $Mn_2O_3$, up to about 0.01% $SO_3$, about 0.02% to about 0.04%, for example, about 0.03% SrO, about 0.01% to about 0.03%, for example, about 0.02% $Cr_2O_3$, about 0.01% to about 0.03%, for example, about 0.02%, or about 0.01% ZnO, and about 0.02% to about 0.04%, for example, about 0.03% BaO. Representative basalt compositions that are useful for the purpose of the disclosure are provided in the examples, below.

As discussed above, the acid-to-base ratio is a target parameter of mineral wool production. An acid to base ratio (A/B) of the slag wool of the disclosure is defined by the ratio of aluminum oxide and silica to calcium oxide and magnesium oxide:

$$(Al_2O_3+SiO_2)/(CaO+MgO)$$

The A/B ratio is suitably in a range of about 1.20 to about 1.70, or about 1.25 to about 1.65, or about 1.25 to about 1.60, for example, about 1.25, about 1.26, about 1.28, about 1.30, about 1.35, about 1.40, about 1.45, about 1.47, about 1.50, about 1.55, about 1.59, or about 1.62.

As described above, the slag wool composition described herein refers to the inorganic raw materials used to produce a slag wool. The composition can include about 60 to about 80 wt. % blast furnace slag, for example, about 65 to about 80 wt. %, about 70 to about 80 wt. %, about 75 to about 80 wt. %, about 60 to about 75 wt. %, about 65 to about 75 wt. %, about 70 to about 75 wt. %, about 60 to about 70 wt. %, about 65 to about 70 wt. %, or about 60 wt. %, about 65 wt. %, about 70 wt. %, about 75 wt. %, or about 80 wt. % blast furnace slag. The composition can further include about 20 to about 40 wt. % basalt, for example, about 20 to about 35 wt. %, about 20 to about 30 wt. %, about 20 to about 25 wt. %, about 25 to about 40 wt. %, about 25 to about 35 wt. %, about 25 to about 30 wt. %, about 30 to about 40 wt. %, about 30 to about 35 wt. %, about 30 to about 35 wt. %, or about 20 wt. %, about 25 wt. %, about 30 wt. %, about 35 wt. %, or about 40 wt. % basalt.

In embodiments, the slag wool composition comprises blast furnace slag and basalt. In embodiments, coke is combined with the slag wool composition and the weight ratio of blast furnace slag and basalt to coke (i.e., (blast furnace slag+basalt)/coke) is in a range of about 5.5 to 7.5, about 6.0 to 7.5, about 6.5 to about 7.2, or about 6.7 to about 7.2, for example, about 6.5, about 6.6, about 6.7, about 6.8, about 6.9, or about 7.0. Advantageously, the amount of coke used to produce the slag wool of the disclosure can be reduced by about 14% relative to the amount of coke used to produce slag wool from a composition of blast furnace slag and granite. For example, the ratio of the amount of raw mineral composition (e.g., slag and granite or slag and basalt) to coke can be about 5.7 for a slag wool composition that does not comprise basalt, and can be increased to about 6.9 for a slag wool composition of the disclosure comprising furnace blast slag and basalt. In embodiments, the slag wool composition is free of granite. As used herein, "free of granite" refers to a composition that has less than 2 wt. %, or less than 1 wt. %, or less than 0.5 wt. % or less than 0.25 wt. % granite. In embodiments, the slag wool composition consists essentially of blast furnace slag and basalt.

In embodiments, other substances can be added to improve the yield and quality of the slag wool.

By using quartz components, in particular quartz sand, in combination with slag, in particular blast furnace slag, it is also possible to influence the melting behavior of the melt positively, which then enables an amorphous solidification of the melt. The quartz sand used for producing mineral fibers generally consists of over 95 wt. % $SiO_2$.

Clay, in particular clay minerals as well as admixtures and by-products, can result in higher strength of continuous mineral fiber. Clay acts as a source of $SiO_2$ and $Al_2O_3$ and optionally $Fe_2O_3$. For example, typical clays used to produce mineral fibers contain between 50 and 90 wt. % $SiO_2$, 10 to 30 wt. % $Al_2O_3$ and up to 20 wt. % $Fe_2O_3$ in addition to small quantities of CaO, MgO, $K_2O$, $TiO_2$.

Fluxing materials, such as fluoride compounds, in particular fluorspar and/or boron compounds, such as boric acid, influence the viscosity of the melt, and thereby can enable the production parameters to be optimized for the subsequent drawing and spinning processes.

Calcium oxide and iron compounds can be used as network modifiers. Due to the iron content, the polyvalent properties of the iron may also be selectively used, for example the optical properties, in particular the infrared absorption, mechanical properties such as tensile strength, binding properties to plastics, etc. Iron compounds can also be added as a means of improving the flow properties of the melt and for imparting color.

Feldspar can be used as a source of $SiO_2$ and $Al_2O_3$. Typical feldspars used to produce mineral fibers have a $SiO_2$ content of more than 60% and an $Al_2O_3$ content of more than 15%. Kaolin can likewise be used as a source of $SiO_2$ and $Al_2O_3$.

The raw material can be prepared in the form of molded bodies. In an alternative embodiment, the raw material may also be introduced into the melting furnace in the form of ground material.

In terms of producing slag wool, any technique producing continuous mineral fibers known from the art may be used. Conventional techniques are described in U.S. Pat. Nos. 2,020,403; 4,720,295; and 5,709,728, all of which are incorporated by reference. Regular wool fabrication involves melting the raw materials, such as slag, basalt, and/or granite, with coke and in the presence of oxygen in a suitable furnace, such as a cupola, and heating the composition to a temperature in the range of 1,400° C. to 2,000° C. The methods disclosed herein are not limited to a cupola type furnace. Other furnaces, such as an electric furnace or a submerged combustion melting furnace would work just as well. Material used in a cupola requires specific product sizing to allow proper bed breathing and combustion air flow. Electric furnaces or submerged combustion melting furnaces accommodate materials that are any size, down to the size of grains of sand. Typical cupola sizing would be 7.5-10 cm (3-4 inches)/10-15 cm (4-6 inches). The melt is then spun into wool in a fiberizing spinner via a continuous air stream. The fibers are then optionally coated, dried, reeled and subjected to further processing depending on the intended application.

The slag wool of the disclosure is particularly advantageous for preparing ceiling tiles. Ceiling tiles can be prepared using the slag wool of the disclosure according to any method known in the art. For example, tiles can be prepared using wet felted production. One version of this process is described in U.S. Pat. No. 5,911,818, herein incorporated by reference. Initially, an aqueous slurry including a dilute aqueous dispersion of mineral wool and a lightweight aggregate such as, for example, clay, pumice, perlite, or vermiculite, is delivered onto a moving foraminous wire of a Fourdrinier-type mat forming machine. Water is drained by gravity from the slurry and then the slurry is optionally further dewatered by means of vacuum suction and/or by pressing. Next, the dewatered base mat, which may still hold some water, is dried in a heated oven or kiln to remove the residual moisture. Panels of acceptable size, appearance and acoustic properties are obtained by finishing the dried base mat. Finishing includes surface grinding, cutting, perforation/fissuring, roll/spray coating, edge cutting and/or laminating the panel onto a scrim or screen. A typical acoustical panel base mat composition includes inorganic mineral fibers, cellulosic fibers, binders and fillers. Examples of typical binders and fillers are described in U.S. Pat. No. 8,133,357 issued to USG Interiors, Inc., herein incorporated by reference in its entirety.

Acoustical panel base mats can further include a back coating. Back coatings are generally known and used in the art. Coatings used in the art for back coating typically include latex based coating and resin based coating which commonly comprise a formaldehyde based resin such as melamine-formaldehyde resin, phenol-formaldehyde resin or urea-formaldehyde resin. Back coating, of a type conventionally used in the art, are typically applied to the dried base mat in a thickness of about 1.5 to 2.0 mils to the dried base mat. Back coating can be used to increase the CAC value for a given caliper tile. The skilled artisan will readily appreciate that NRC values and CAC values are substantially inversely related, because of the tile density and core structure. In particular, lower tile density (e.g., more porous structure) provides better NRC (i.e., decreased sound deflection) while lessening CAC (i.e., increased sound transmission). Thus, for a given caliper tile as the NRC value increases, the CAC value generally decreases and vice versa.

Diameter Determination

A Cottonscope HD (BSC Electronics, or equivalent) is used to measure wool diameters. The Cottonscope uses laser and image analyses technology for fast and easy measurement of fiber diameter. Fibers are cut using a guillotine device to a length of 700 microns for fiber dispersion and analysis. The fibers are dropped into a water bowl with a magnetic stirrer to disperse the fibers. The fibers progress through a gap between a right angled prism and a glass window, where images are captured by a digital camera. The fiber images are analyzed for fiber diameter and distribution. 5000 fibers are counted within 60 seconds, which gives reliable diameter distribution, making it possible to monitor fiber diameter accurately and efficiently.

Shot Content Determination—Sieve-Brushing Method

The shot content measurement method uses sieves of 50-mesh, 100-mesh, 200-mesh, 325-mesh, with brushing and vacuum on crushed mineral wool samples. A sample of slag wool is weighed to the nearest milligram. If organic binder is present, the sample is heated in a furnace maintained at 550° C.±10° C. for 1 hour. A lower temperature can be used if the material shows a tendency to fuse or melt. The sample is then crushed in a hydraulic press. The crushed material is transferred to a 50 mesh (297 micron) sieve. The finer shot and crushed fibers pass through the sieve. The shot remaining on the 50 mesh sieve is weighed to the nearest milligram. The finer shots and crushed fibers that passed through the 50 mesh sieve are transferred to a 100 mesh (149 microns) sieve. Again the finer shot and crushed fiber pass through the sieve and the shot remaining on the 100 mesh sieve is weighed to the nearest milligram. The same procedure is used with the 200 mesh (74 micron) and 325 mesh (44 micron) sieves. The crushed fibers are fine enough to pass through the 325 mesh sieve. The amounts of shot collected on the 50 mesh, 100 mesh, 200 mesh, and 325 mesh sieves are added together to determine the total shot weight. From the total shot weight and the total sample weight taken prior to sieving, the percent of shot in the sample can be calculated as described in ASTM C1335-04.

Loft Determination 50 grams of wool is well mixed with 950 grams of water for 10 minutes and settled in a graduated cylinder. After 10-minute settle, the water is drained and the height of the wool volume is measured. The loft value indicates the wool bulking capacity.

Fiber Composition Determination

The oxides of the slag wool were analyzed by a third party lab, Construction Technology Laboratories Group. The A/B ratio of the slag wool can be calculated based on the oxides results.

EXAMPLES

For the examples below, unless indicated otherwise, the cupola operation conditions were as follows:

| | |
|---|---|
| Combustion air (SCFM) | 4400-4800 |
| Wheel speeds (Hz) | 50 |
| Air-ring Pressure (psi) | 6.8 |
| Poly set point (gph) | 22 |

Example 1: 30% Basalt and 70% Slag

Slag wool was produced from a slag wool composition comprising 30 wt. % Dresser basalt and 70 wt. % blast furnace slag. Basalt, blast furnace slag, and coke were combined in a cupola in the amounts provided in Table 1, below. A control slag wool comprising slag and granite was also prepared using raw materials in the amounts indicated in Table 1, below.

TABLE 1

| Example 1 | Slag + Basalt | Control | Slag + Granite |
|---|---|---|---|
| Coke (lb) | 716-685 | Coke (lb) | 675 |
| Slag (lb) | 2720 | Slag (lb) | 3810 |
| Basalt (lb) | 1166 | Granite (lb) | 190 |
| Oxygen (SCFM) | 105 | Oxygen (SCFM) | 105 |
| % Basalt | 30% | % Granite | 5.90% |

The composition of the raw blast furnace slag and basalt are provided in Table 2, below. Table 2 further provides the composition of the resulting slag wool prepared from the 30 wt. % basalt slag wool composition.

TABLE 2

| Compound | Slag (weight %) | Basalt (weight %) | 30% Basalt, 70% slag (weight %) |
| --- | --- | --- | --- |
| $SiO_2$ | 40.19 | 48.81 | 43.30 |
| $Al_2O_3$ | 8.43 | 15.14 | 11.29 |
| $Fe_2O_3$ | 0.25 | 13.85 | 3.08 |
| MgO | 10.34 | 5.97 | 9.03 |
| CaO | 38.6 | 9.40 | 30.04 |
| $SO_3$ | 0.93 | <0.01 | 0.76 |
| $Na_2O$ | 0.25 | 2.26 | 0.87 |
| $K_2$ | 0.49 | 0.67 | 0.57 |
| $TiO_2$ | 0.36 | 1.82 | 0.81 |
| $P_2O_5$ | 0.01 | 0.19 | 0.05 |
| $Mn_2O_3$ | 0.52 | 0.20 | 0.39 |
| SrO | 0.05 | 0.03 | 0.04 |
| $Cr_2O_3$ | <0.01 | 0.02 | <0.01 |
| ZnO | <0.01 | 0.01 | <0.01 |
| BaO | 0.04 | 0.03 | 0.04 |
| A/B Ratio | 0.99 | 4.16 | 1.40 |

The A/B ratio of the slag wool prepared from the 30% basalt slag wool composition was about 1.40. The average wool diameters were determined according to the diameter determination method described above. The average wool diameters for the 30% basalt fibers were in the range of 4.68 to 6.52 microns (average 5.44 microns). The control fibers had diameters in the range of 3.75 to 4.69 microns (average 4.10 microns). Further, there was a reduction of fine fibers with the use of basalt and the shot content decreased from 49% (control wool) to 40% (basalt wool).

Thus, Example 1 shows the preparation of slag wool according to the disclosure from a slag wool composition according to the disclosure, with reduced shot content and a desirable average mineral wool diameter. These fibers are particularly suitable for use in acoustic tiles as described in Example 6.

Example 2: 20% Basalt and 80% Slag

Slag wool was produced from a slag wool composition comprising 20 wt. % Dresser basalt and 80 wt. % blast furnace slag. Basalt, blast furnace slag, and coke were combined in a cupola in the amounts provided in Table 3, below. A control slag wool comprising slag and granite was also prepared using raw materials in the amounts indicated in Table 3, below.

TABLE 3

| Example 2 | Slag + Basalt | Control | Slag + Granite |
| --- | --- | --- | --- |
| Coke (lb) | 597 | Coke (lb) | 565 |
| Slag (lb) | 2824 | Slag (lb) | 3340 |
| Basalt (lb) | 706 | Granite (lb) | 190 |
| Oxygen (SCFM) | 95 | Oxygen (SCFM) | 95 |
| % Basalt | 20% | % Granite | 5.90% |

The composition of the raw blast furnace slag and basalt are provided in Table 4, below. Table 4 further provides the composition of the resulting slag wool prepared from the 20 wt. % basalt slag wool composition.

TABLE 4

| Compound | Slag (weight %) | Basalt (weight %) | 20% Basalt, 80% slag (weight %) |
| --- | --- | --- | --- |
| $SiO_2$ | 35.33 | 47.70 | 42.23 |
| $Al_2O_3$ | 9.78 | 14.89 | 10.64 |
| $Fe_2O_3$ | 0.28 | 13.85 | 2.14 |
| MgO | 11.36 | 6.19 | 9.34 |
| CaO | 40.59 | 9.49 | 32.84 |
| $SO_3$ | 1.18 | <0.01 | 0.49 |
| $Na_2O$ | 0.15 | 2.39 | 0.71 |
| $K_2O$ | 0.32 | 0.61 | 0.55 |
| $TiO_2$ | 0.44 | 1.73 | 0.69 |
| $P_2O_5$ | <0.01 | 0.18 | 0.03 |
| $Mn_2O_3$ | 0.19 | 0.19 | 0.40 |
| SrO | 0.05 | 0.03 | 0.05 |
| $Cr_2O_3$ | <0.01 | 0.02 | <0.01 |
| ZnO | <0.01 | 0.02 | <0.01 |
| BaO | 0.04 | 0.03 | 0.04 |
| A/B Ratio | 0.87 | 4.94 | 1.25 |

The A/B ratio of the slag wool prepared from the 20% basalt slag wool composition was about 1.25. The average wool diameters were determined according to the diameter determination method described above. The average wool diameters for the 20% basalt fibers were in the range of 3.91 to 5.58 microns (average 4.84 microns). The control fibers had diameters in the range of 4.16 to 4.65 microns (average 4.36 microns). Further, there was a reduction of fine fibers with the use of 20% basalt.

Thus, Example 2 shows preparation of slag wool according to the invention from a slag wool composition according to the invention, with a desirable average mineral wool diameter. These fibers are particularly suitable for use in acoustic tiles as described in Example 6.

Comparative Example 1: 10% Basal and 90% Slag

Slag wool was produced from a slag wool composition comprising 10 wt. % Dresser basalt and 90 wt. % blast furnace slag. Basalt, blast furnace slag, and coke were combined in a cupola in the amounts provided in Table 5, below. A control slag wool comprising slag and granite was also prepared using raw materials in the amounts indicated in Table 5, below.

TABLE 5

| Comparative Example 1 | Slag + Basalt | Control | Slag + Granite |
| --- | --- | --- | --- |
| Coke (lb) | 585 | Coke (lb) | 565 |
| Slag (lb) | 3178 | Slag (lb) | 3340 |
| Basalt (lb) | 354 | Granite (lb) | 190 |
| Oxygen (SCFM) | 95 | Oxygen (SCFM) | 95 |
| % Basalt | 10% | % Granite | 5.90% |

The composition of the raw blast furnace slag and basalt are provided in Table 6, below. Table 6 further provides the composition of the resulting slag wool prepared from the 10 wt. % basalt slag wool composition.

TABLE 6

| Compound | Slag (weight %) | Basalt (weight %) | 10% Basalt, 90% slag (weight %) |
| --- | --- | --- | --- |
| $SiO_2$ | 35.33 | 47.70 | 41.02 |
| $Al_2O_3$ | 9.78 | 14.89 | 9.80 |

TABLE 6-continued

| Compound | Slag (weight %) | Basalt (weight %) | 10% Basalt, 90% slag (weight %) |
|---|---|---|---|
| $Fe_2O_3$ | 0.28 | 13.85 | 1.23 |
| MgO | 11.36 | 6.19 | 9.72 |
| CaO | 40.59 | 9.49 | 35.69 |
| $SO_3$ | 1.18 | <0.01 | 0.54 |
| $Na_2O$ | 0.15 | 2.39 | 0.46 |
| $K_2O$ | 0.32 | 0.61 | 0.54 |
| $TiO_2$ | 0.44 | 1.73 | 0.54 |
| $P_2O_5$ | <0.01 | 0.18 | 0.02 |
| $Mn_2O_3$ | 0.19 | 0.19 | 0.43 |
| SrO | 0.05 | 0.03 | 0.05 |
| $Cr_2O_3$ | <0.01 | 0.02 | <0.01 |
| ZnO | <0.01 | 0.02 | <0.01 |
| BaO | 0.04 | 0.03 | 0.04 |
| A/B Ratio | 0.87 | 4.94 | 1.12 |

The A/B ratio of the slag wool produced from the 10% basalt slag wool composition was about 1.12. The average wool diameters were determined according to the diameter determination method as described above. The average wool diameter for the 10% basalt fibers was about 4.16 microns and the average wool diameter for the control was about 4.36 microns. Thus, the 10% basalt fibers did not demonstrate a diameter increase relative to control fibers, rather, the average fiber diameter slightly decreased.

Example 3: 20% Basalt and 80% Slag

Slag wool was produced from a slag wool composition comprising 20 wt. % Dresser basalt and 80 wt. % blast furnace slag. Basalt, blast furnace slag, and coke were combined in a cupola in the amounts provided in Table 7, below. A control slag wool comprising slag and granite was also prepared using raw materials in the amounts indicated in Table 7, below.

TABLE 7

| Example 3 | Slag + Basalt | Control | Slag + Granite |
|---|---|---|---|
| Coke (lb) | 560 | Coke (lb) | 554 |
| Slag (lb) | 2824 | Slag (lb) | 3340 |
| Basalt (lb) | 706 | Granite (lb) | 195 |
| Oxygen (SCFM) | 120 | Oxygen (SCFM) | 120 |
| % Basalt | 20% | % Granite | 5.90% |

The composition of the resulting slag wool prepared from the 20 wt. % basalt slag wool composition is provided in Table 8, below.

TABLE 8

| Compound | 20% Basalt, 80% slag (weight %) |
|---|---|
| $SiO_2$ | 42.34 |
| $Al_2O_3$ | 10.62 |
| $Fe_2O_3$ | 2.32 |
| MgO | 9.27 |
| CaO | 32.76 |
| $SO_3$ | 0.84 |
| $Na_2O$ | 0.72 |
| $K_2O$ | 0.52 |
| $TiO_2$ | 0.67 |
| $P_2O_5$ | 0.04 |
| $Mn_2O_3$ | 0.41 |
| SrO | 0.05 |
| $Cr_2O_3$ | <0.01 |
| ZnO | <0.01 |

TABLE 8-continued

| Compound | 20% Basalt, 80% slag (weight %) |
|---|---|
| BaO | 0.04 |
| A/B Ratio | 1.26 |

The A/B ratio of the slag wool prepared from the 20% basalt slag wool composition was about 1.26. The average wool diameters were determined according to the diameter determination method described above. The average wool diameters for the 20% basalt fibers were in the range of 3.92 to 5.29 microns (average 4.50 microns). The average wool diameter for the control was in the range of 3.56 to 4.08 microns (average 3.83 microns). Further, there was a reduction of fine fibers with the use of 20% basalt. The average shot content of the basalt fibers was about 2-3% lower (48.41%) than that in the control samples (50.72%).

Thus, Example 3 shows preparation of slag wool according to the invention from a slag wool composition according to the invention, with reduced shot content and a desirable average mineral wool diameter. These fibers are particularly suitable for use in acoustic tiles as described in Example 6.

Example 4: 35% Basalt and 65% Slag

Slag wool was produced from a slag wool composition comprising 35 wt. % Dresser basalt and 65 wt. % blast furnace slag. The composition of the raw blast furnace slag and basalt are provided in Table 9, below. A control slag wool comprising slag (94 wt. %) and granite (6 wt. %) was also prepared. The composition of the slag wool prepared from the 35 wt. % basalt slag wool composition is provided in Table 9, below.

TABLE 9

| Compound | Slag | Basalt | 35% Basalt, 65% slag |
|---|---|---|---|
| $SiO_2$ | 40.19 | 48.97 | 44.33 |
| $Al_2O_3$ | 8.43 | 15.20 | 11.57 |
| $Fe_2O_3$ | 0.25 | 13.52 | 6.07 |
| MgO | 10.34 | 6.45 | 8.42 |
| CaO | 38.6 | 8.45 | 26.19 |
| $Na_2O$ | 0.25 | 2.60 | 1.66 |
| $K_2O$ | 0.49 | 0.77 | 0.54 |
| $TiO_2$ | 0.36 | 1.74 | 0.95 |
| $P_2O_5$ | 0.01 | 0.19 | 0.04 |
| $Mn_2O_3$ | 0.52 | 0.21 | 0.41 |
| $Cr_2O_3$ | 0.01 | 0.02 | 0.01 |
| A/B Ratio | 0.99 | 4.31 | 1.62 |

The A/B ratio of the slag wool produced from the 35% basalt slag wool composition was about 1.62. Total average shot content for the control was 45.3%. Total average shot content for the 35% basalt wool was 38.3%. The average fiber diameters were determined according to the diameter determination method described above. The average fiber diameter of the control was 4.34 microns and the fiber diameter for the 35% basalt wool was in the range of 5.30 microns to 7.71 microns (average 6.57 microns).

Thus, Example 4 shows preparation of slag wool according to the invention from a slag wool composition according to the invention, with reduced shot content and a desirable average mineral wool diameter. These fibers are particularly suitable for use in acoustic tiles as described in Example 6.

Example 5: 40% Basalt and 60% Slag

Slag wool was produced from a slag wool composition comprising 40 wt. % Dresser basalt and 60 wt. % blast furnace slag. The composition of the raw blast furnace slag and basalt are provided in Table 10, below. The composition of the slag wool prepared from the 40 wt. % basalt slag wool composition is provided in Table 10, below.

TABLE 10

| Compound | Slag | Basalt | 40% Basalt, 60% slag |
|---|---|---|---|
| $SiO_2$ | 40.2 | 49.0 | 44.3 |
| $Al_2O_3$ | 8.4 | 15.2 | 11.7 |
| $Fe_2O_3$ | 0.3 | 13.5 | 5.6 |
| MgO | 10.3 | 6.5 | 9.7 |
| CaO | 38.6 | 8.5 | 25.6 |
| $Na_2O$ | 0.3 | 2.6 | 1.1 |
| $K_2O$ | 0.5 | 0.8 | 0.7 |
| $TiO_2$ | 0.4 | 1.7 | 1.0 |
| $P_2O_5$ | 0.01 | 0.2 | 0.1 |
| $Mn_2O_3$ | 0.5 | 0.2 | 0.3 |
| $Cr_2O_3$ | 0.01 | 0.02 | 0.01 |
| A/B Ratio | 0.99 | 4.31 | 1.59 |

The A/B ratio of the slag wool produced from the 40% basalt slag wool composition was about 1.59. Shot content for the 40% basalt wool was in the range of 38.5% to 41.7% (average 40.1%). The average fiber diameters were determined according to the diameter determination method described above. The average fiber diameter of the 40% basalt wool was in the range of 7.36 to 9.68 micron (average 8.33 micron).

Thus, Example 5 shows preparation of slag wool according to the invention from a slag wool composition according to the invention, with reduced shot content and a desirable average mineral wool diameter. These fibers are particularly suitable for use in acoustic tiles as described in Example 6.

Example 6: Acoustic Properties

20% basalt wool samples were prepared as in Examples 2 and 3. The 20% basalt wools had A/B values in the range of 1.25-1.28, average fiber diameters in the range of 4.3-4.9 micron and shot content in the range of 47 to 50%. The 20% basalt wools were used to produce ceiling tiles of five different calipers (½", ⅝", ¾", ⅞", and 1"). In these trials, comparative slag wool (prepared from slag and granite) was replaced by 20% basalt wool with the same usage based on weight. As described in the tables below, different 20% basalt wool samples lead to substantially similar but somewhat different results for otherwise identical tiles. The NRC values were determined in accordance with ASTM C423 and the CAC values were determined in accordance with ASTM E1414. One of ordinary skill in the art will readily appreciate that NRC values and CAC values are substantially inversely related, because of the tile density and core structure. In particular, lower tile density (e.g., more porous structure) provides better NRC (i.e., decreased sound deflection) while lessening CAC (i.e., increased sound transmission). Thus, for a given caliper tile as the NRC value increases, the CAC value generally decreases and vice versa. Back coating can be used to balance the acoustic properties (e.g., the CAC value and the NRC value) for a given caliper tile.

Tiles made at ½" and ⅝" caliper with basalt wool or control slag wool were laminated with surfacing veil and painted to have the same, controlled, light reflectance. The NRC and CAC values for the ½" and ⅝" caliper ceiling tiles are provided below in Table 12.

TABLE 12

| Wool | Caliper | NRC | CAC (dB) |
|---|---|---|---|
| Comparative—Slag and granite | ⅝ | 0.70 | 34 |
| Basalt | ½ | 0.85 | 23 |
| Basalt (with tile back coating) | ⅝ | 0.85 | 25 |
| Basalt | ⅝ | 0.85 | 24 |

The tiles including the basalt wool demonstrated improved NRC acoustic properties relative to the tiles made from wool comprising slag and granite for the same caliper tile. The tiles including the basalt wool demonstrated lower, but still acceptable, CAC values relative to the tiles made from wool comprising slag and granite. The basalt wool further allowed for a "trimmer" density (base mat density) of 11-12 pcf which was not attainable with the control wool, due to the limited lofting ability of the slag wool.

Tiles made at ¾" caliper with basalt wool or control slag wool were laminated with surfacing veil and painted to have the same, controlled, light reflectance. The base mat density was optimized (12.5 to 15 pcf) for tile made with basalt wool. The NRC and CAC values for the ¾" caliper ceiling tiles are provided below in Table 13.

TABLE 13

| Wool | Caliper | NRC | CAC (dB) |
|---|---|---|---|
| Comparative—Slag and granite (with tile back coating) | ¾ | 0.70 | >35 |
| Basalt | ¾ | 0.85 | 25 |
| Basalt (with tile back coating) | ¾ | 0.80 | 28 |
| Basalt (with tile back coating) | ¾ | 0.75 | 36 |

The tiles including the basalt wool demonstrated improved NRC values relative to the tiles made from wool comprising slag and granite. One of ordinary skill in the art will appreciate that an increase in the NRC value of 0.05 is a significant result. Some of the tiles including the basalt wool demonstrated lower, but still acceptable, CAC values relative to the tiles made from wool comprising slag and granite.

Tiles made at ⅞" and 1" caliper with basalt wool or control slag wool were laminated with surfacing veil and painted to have the same, controlled, light reflectance. The NRC and CAC values for the ⅞" and 1" caliper ceiling tiles are provided below in Table 14.

TABLE 14

| Wool | Caliper | NRC | CAC (dB) |
|---|---|---|---|
| Comparative—Slag and Granite (with back coating) | ⅞ | 0.80 | 35 |
| Basalt | ⅞ | 0.90 | 28 |
| Basalt (with tile back coating) | ⅞ | 0.85 | 35 |
| Basalt | 1 | 0.90 | 32 |
| Basalt (with tile back coating) | 1 | 0.90 | 32 |

The tiles including the basalt wool demonstrated improved NRC acoustic properties relative to the tiles made from wool comprising slag and granite. One of ordinary skill in the art will appreciate that an increase in the NRC value of 0.05 is a significant result. Some of the tiles including the basalt wool demonstrated lower, but still acceptable, CAC values relative to the tiles made from wool comprising slag and granite.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of conflict between the present disclosure and incorporated patents, publications, and references, the present disclosure should control.

What is claimed:

1. A slag wool composition comprising:
    about 60 wt. % to about 80 wt. % blast furnace slag; and
    about 20 wt. % to about 40 wt. % basalt, based on the total weight of the inorganic raw materials;
    wherein the composition has an A/B ratio in a range of about 1.20 to about 1.70 wherein the basalt comprises about 47.5 wt. % to about 49.5 wt. % $SiO_2$, about 8.4 wt. % to about 9.5 wt. % CaO, about 5.9 wt. % to about 7.0 wt. % MgO, about 14.5 wt. % to about 15.5 wt. % $Al_2O_3$, about 13.0 wt. % to about 14.0 wt. % $Fe_2O_3$, about 2.0 wt. % to about 3.0 wt. % $Na_2O$, about 0.15 wt. % to about 0.25 wt. % $P_2O_5$, about 0.55 wt. % to about 0.85 wt. % $K_2O$, about 1.65 wt. % to about 2.00 wt. % $TiO_2$, about 0.15 wt. % to about 0.25 wt. % $Mn_2O_3$, up to about 0.01 wt. % $SO_3$, about 0.02 wt. % to about 0.04 wt. % SrO, about 0.01 wt. % to about 0.03 wt. % $Cr_2O_3$, about 0.01 wt. % to about 0.03 wt. % ZnO, and about 0.02 wt. % to about 0.04 wt. % BaO.

2. The slag wool composition of claim 1, wherein the composition has an A/B ratio in a range of about 1.25 to about 1.65.

3. The slag wool composition of claim 1, wherein the composition has an A/B ratio in a range of about 1.25 to about 1.60.

4. The slag wool composition of claim 1, consisting essentially of the blast furnace slag and the basalt.

5. A slag wool composition comprising:
    about 60 wt. % to about 80 wt. % blast furnace slag; and
    about 20 wt. % to about 40 wt. % basalt, based on the total weight of the inorganic raw materials;
    wherein the composition has an A/B ratio in a range of about 1.20 to about 1.70, wherein the blast furnace slag comprises about 35.0 wt. % to about 40.5 wt. % $SiO_2$, about 35.5 wt. % to about 40.6 wt. % CaO, about 10.3 wt. % to about 11.4 wt. % MgO, about 8.4 wt. % to about 9.8 wt. % $Al_2O_3$, about 0.2 wt. % to about 0.3 wt. % $Fe_2O_3$, about 0.1 wt. % to about 0.3 wt. % $Na_2O$, up to about 0.01 wt. % $P_2O_5$, about 0.3 wt. % to about 0.5 wt. % $K_2O$, about 0.2 wt. % to about 0.5 wt. % $TiO_2$, about 0.15 wt. % to about 0.55 wt. % $Mn_2O_3$, about 0.3 wt. % to about 1.2 wt. % $SO_3$, about 0.04 wt. % to about 0.06 wt. % SrO, up to about 0.01 wt. % $Cr_2O_3$, up to about 0.01 wt. % ZnO, and about 0.03% to about 0.05 wt. % BaO.

6. The slag wool composition of claim 5, wherein the composition has an A/B ratio in a range of about 1.25 to about 1.65.

7. The slag wool composition of claim 5, wherein the composition has an A/B ratio in a range of about 1.25 to about 1.60.

8. A slag wool produced using the composition of claim 5, wherein the slag wool has a fiber diameter in a range of about 4.0 microns to about 10.0 microns.

9. A slag wool produced using the composition of claim 1, wherein the slag wool has a fiber diameter in a range of about 4.0 microns to about 10.0 microns.

10. The slag wool of claim 9, wherein the slag wool has a shot content of about 50% or less.

11. The slag wool of claim 9, wherein the slag wool has a shot content of about 45% or less.

12. The slag wool of claim 9, wherein the slag wool has a shot content of about 40% or less.

13. The slag wool of claim 9, wherein the slag wool has an A/B ratio in a range of 1.20 to about 1.70.

14. The slag wool of claim 9, wherein the composition has an A/B ratio in a range of about 1.25 to about 1.65.

15. The slag wool of claim 9, wherein the composition has an A/B ratio in a range of about 1.25 to about 1.60.

16. The slag wool of claim 9, wherein the slag wool has a shot content of about 50% or less.

17. The slag wool of claim 9, wherein the slag wool has a shot content of about 40% or less.

18. The slag wool of claim 9, wherein the slag wool has an A/B ratio in a range of 1.20 to about 1.70.

19. A method for the manufacture of slag wool, comprising:
    providing a composition comprising about 60 wt. % to about 80 wt. % blast furnace slag and about 10 wt. % to about 40 wt. % basalt, based on the total weight of the inorganic raw materials, such that the composition has an A/B ratio in a range of about 1.20 to about 1.70;
    heating the composition in a cupola or open furnace, further comprising providing coke such that the weight ratio of blast furnace slag and basalt to coke ((blast furnace slag+basalt)/coke) is about 6.9.

20. The method of claim 19, wherein the composition has an A/B ratio in a range of 1.25 to about 1.65.

21. The method of claim 19, wherein the composition has an A/B ratio in a range of 1.25 to about 1.60.

22. The method of claim 19, wherein the composition consists essentially of the blast furnace slag and the basalt.

23. The method of claim 14, wherein the blast furnace slag comprises about 35.0 wt. % to about 40.5 wt. % $SiO_2$, about 35.5 wt. % to about 40.6 wt. % CaO, about 10.3 wt. % to about 11.4 wt. % MgO, about 8.4 wt. % to about 9.8 wt. % $Al_2O_3$, about 0.2 wt. % to about 0.3 wt. % $Fe_2O_3$, about 0.1 wt. % to about 0.3 wt. % $Na_2O$, up to about 0.01 wt. % $P_2O_5$, about 0.3 wt. % to about 0.5 wt. % $K_2O$, about 0.2 wt. % to about 0.5 wt. % $TiO_2$, about 0.15 wt. % to about 0.55 wt. % $Mn_2O_3$, about 0.3 wt. % to about 1.2 wt. % $SO_3$, about 0.04 wt. % to about 0.06 wt. % SrO, up to about 0.01 wt. % $Cr_2O_3$, up to about 0.01 wt. % ZnO, and about 0.03% to about 0.05 wt. % BaO.

24. The method of claim 19, wherein the basalt comprises about 47.5 wt. % to about 49.5 wt. % $SiO_2$, about 8.4 wt. % to about 9.5 wt. % CaO, about 5.9 wt. % to about 7.0 wt. % MgO, about 14.5 wt. % to about 15.5 wt. % $Al_2O_3$, about 13.0 wt. % to about 14.0 wt. % $Fe_2O_3$, about 2.0 wt. % to about 3.0 wt. % $Na_2O$, about 0.15 wt. % to about 0.25 wt. % $P_2O_5$, about 0.55 wt. % to about 0.85 wt. % $K_2O$, about 1.65 wt. % to about 2.00 wt. % $TiO_2$, about 0.15 wt. % to about 0.25 wt. % $Mn_2O_3$, up to about 0.01 wt. % $SO_3$, about 0.02 wt. % to about 0.04 wt. % SrO, about 0.01 wt. % to about 0.03 wt. % $Cr_2O_3$, about 0.01 wt. % to about 0.03 wt. % ZnO, and about 0.02 wt. % to about 0.04 wt. % BaO.

* * * * *

UNITED STATES PATENT AND TRADEMARK OFFICE
CERTIFICATE OF CORRECTION

PATENT NO. : 9,796,635 B1  
APPLICATION NO. : 15/189662  
DATED : October 24, 2017  
INVENTOR(S) : Wenqi Luan et al.

Page 1 of 1

It is certified that error appears in the above-identified patent and that said Letters Patent is hereby corrected as shown below:

In the Claims

At Column 16, Line 43, "claim 14," should be -- claim 19, --.

Signed and Sealed this  
Seventeenth Day of April, 2018

Andrei Iancu  
*Director of the United States Patent and Trademark Office*